United States Patent
Ishida et al.

(10) Patent No.: US 6,422,303 B1
(45) Date of Patent: Jul. 23, 2002

(54) SILENT HEAT EXCHANGER AND FAN ASSEMBLY

(75) Inventors: Kenzo Ishida, San Jose, CA (US); Shinya Endo, Ibaraki-Ken (JP); Daryl J. Nelson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/524,798

(22) Filed: Mar. 14, 2000

(51) Int. Cl.⁷ .................................................. F28F 7/00
(52) U.S. Cl. .............................. 165/80.3; 165/104.33; 165/185; 165/135; 361/69.7; 361/700; 257/706; 257/715
(58) Field of Search .......................... 165/135, 80.3, 165/185, 104.33; 257/706, 722, 715, 721; 361/700, 690, 695, 696, 697; 181/224, 225

(56) References Cited

U.S. PATENT DOCUMENTS

| 4,505,326 A | | 3/1985 | Hazen | |
|---|---|---|---|---|
| 5,019,880 A | * | 5/1991 | Higgins, III | 165/80.3 |
| 5,102,040 A | * | 4/1992 | Harvey | 165/40 |
| 5,249,741 A | * | 10/1993 | Bistline et al. | 165/80.3 |
| 5,636,286 A | | 6/1997 | Makabe et al. | |
| 5,765,743 A | * | 6/1998 | Sakiura et al. | 165/80.3 |
| 5,940,272 A | * | 8/1999 | Emori et al. | 361/704 |
| 5,946,188 A | | 8/1999 | Rochel et al. | |
| 6,041,851 A | * | 3/2000 | Diebel et al. | 165/104.33 |
| 6,043,980 A | * | 3/2000 | Katsui | 361/695 |
| 6,094,345 A | * | 7/2000 | Diemunsch | 361/695 |

FOREIGN PATENT DOCUMENTS

| GB | 2236200 | * | 3/1991 | 165/135 |
|---|---|---|---|---|
| JP | 2-61450 | * | 3/1990 | 165/135 |
| JP | 4-281125 | * | 10/1992 | 165/135 |
| JP | 07028479 | | 1/1995 | |
| JP | 07168579 | | 4/1995 | |
| JP | 11153099 | | 8/1999 | |

* cited by examiner

*Primary Examiner*—Henry Bennett
*Assistant Examiner*—Terrell McKinnon
(74) *Attorney, Agent, or Firm*—Robert G. Winkle

(57) ABSTRACT

A heat dissipation device comprising a thermally conductive, hollow housing having a fan and an active anti-noise module disposed within the hollow housing. The hollow housing may include a plurality of fins disposed therein to increase the surface area for convective heat transfer. The heat dissipation device further may further include heat pipes for the transportation and dispersion of heat to and about an external surface of the hollow housing.

19 Claims, 5 Drawing Sheets

SILENT HEAT EXCHANGER AND FAN ASSEMBLY

BACKGROUND OF THE INVENTION

1. Field of the Invention

The present invention relates to apparatus for cooling a microelectronic die. In particular, the present invention relates to a heat dissipation device including an active noise canceling mechanism.

2. State of the Art

Higher performance, lower cost, increased miniaturization of integrated circuit components, and greater packaging density of integrated circuits are ongoing goals of the microelectronics industry. As these goals are achieved, microelectronic dice become smaller. Accordingly, the density of power consumption of the integrated circuit components in the microelectronic die has increased, which, in turn, increases the average junction temperature of the microelectronic die. If the temperature of the microelectronic die or particular areas on the microelectronic die becomes too high, the integrated circuits of the microelectronic die may be damaged (which can result in system reliability problems) or destroyed (system failure).

Such damage or destruction is avoided by thermally attaching heat dissipation devices to the microelectronic die. FIG. 4 illustrates an exemplary heat dissipation device (shown as a finned heat slug 202) attached to a microelectronic die 204 with a layer of thermally conductive adhesive 212. The microelectronic die 204 is electrically attached to a carrier substrate 206 through a plurality of electrical interconnects (shown as first solder balls 208). A fan assembly 214 is usually attached to the finned heat slug 202 which enhances convective heat dissipation by forcing ambient air through the finned heat slug 202.

Another known method of removing heat from a microelectronic die is the use of a heat pipe 220, as shown in FIG. 5. A heat pipe 220 is a simple device that can quickly transfer heat from one point to another without the use of electrical or mechanical energy input. The heat pipe 220 is generally formed by evacuating air from a sealed pipe 222 which contains a "working fluid" 224, such as water or alcohol. The sealed pipe 222 is oriented with a first end 226 proximate a heat source 228. The working fluid 224, which is in a liquid phase proximate the heat source 228, increases in temperature and evaporates to form a gaseous phase of the working fluid 224, which moves (shown by arrows 232) toward a second end 234 of the sealed pipe 222. As the gaseous phase moves toward the sealed pipe second end 234, it condenses to again form the liquid phase of the working fluid 224, thereby releasing the heat absorbed during the evaporation of the liquid phase of the working fluid 224. The liquid phase returns, usually by capillary action or gravity, to the sealed pipe first end 226 proximate the heat source 228, wherein the process is repeated. Thus, the heat pipe 220 is able to rapidly transfer heat away from the heat source 228. Various configurations of heat pipes have been used to cool microelectronic dice and they have been used in conjunction with finned heat slugs 202 and fan assemblies 214 (FIG. 4).

Although these heat dissipation methods are adequate to cool most microelectronic dice, they cannot fully address the heat dissipation requirements of high temperature generating microelectronic dice. One method of addressing the heat dissipation requirements is the use of a refrigeration-type cooling method, as known in the art. However, such refrigeration-type methods are prohibitively expensive.

Another method of addressing such heat removal is to simply increase the size or speed (rpm) of the fans (see fan assembly 214 of FIG. 4). However, this increases the noise generated by the fan. Unfortunately, personal computer ("PC") manufactures have set fan noise limits to about 24 decibels (avg.) at 1 meter from a PC case and about 29 decibels (avg.) at 1 meter from a liquid crystal display desktop PC case. Thus, only increasing the size or speed of the fans is not an adequate solution.

Therefore, it would be advantageous to develop a heat dissipation device and techniques to cost effectively control heat removal from a microelectronic die, while not increasing the noise generated by the heat dissipation device.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE ILLUSTRATED EMBODIMENT

Figure 1:
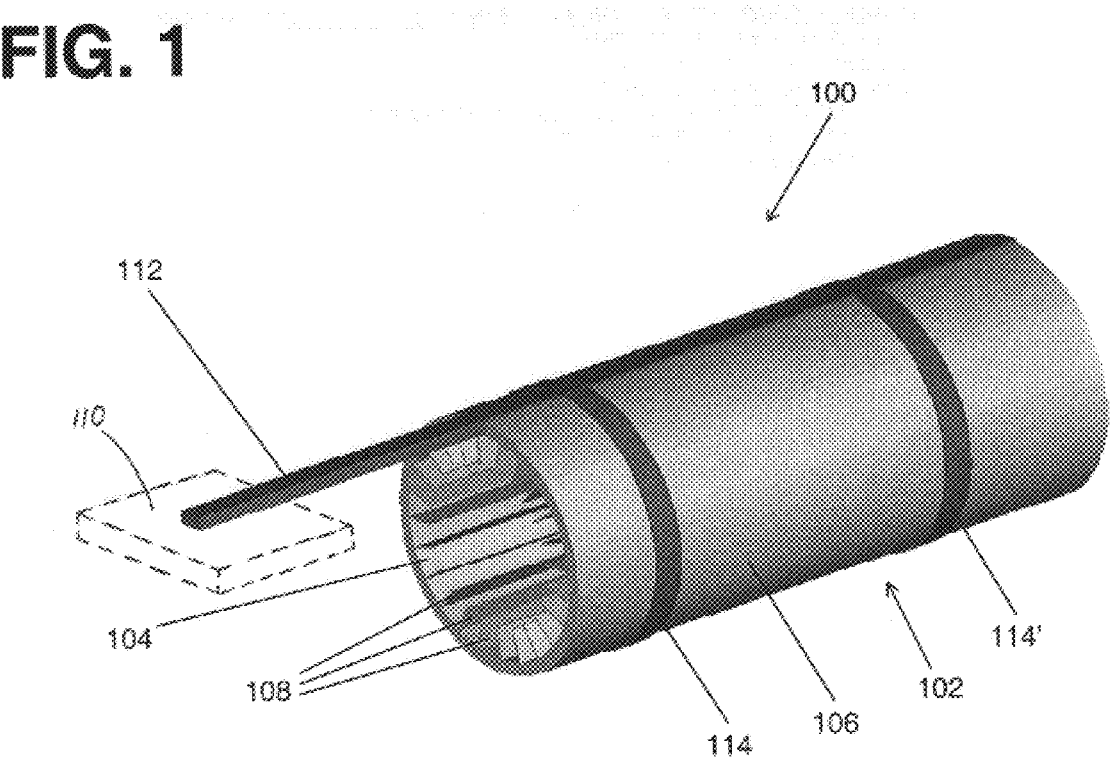
FIG. 1 is an oblique view of a heat dissipation device, according to the present invention.
Figure 2:
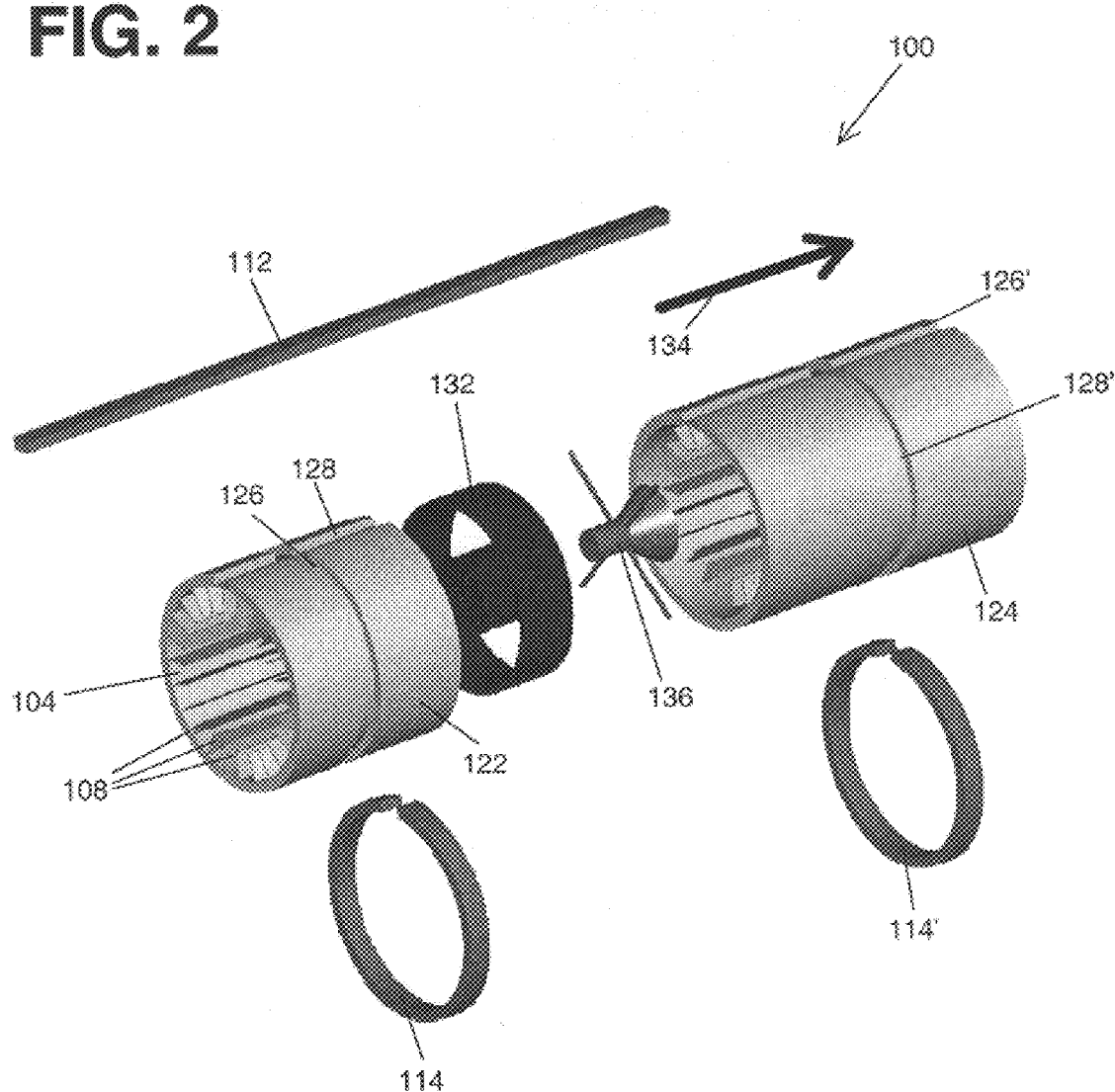
FIG. 2 is an exploded view of the heat dissipation device of FIG. 1, according to the present invention.
Figure 3:
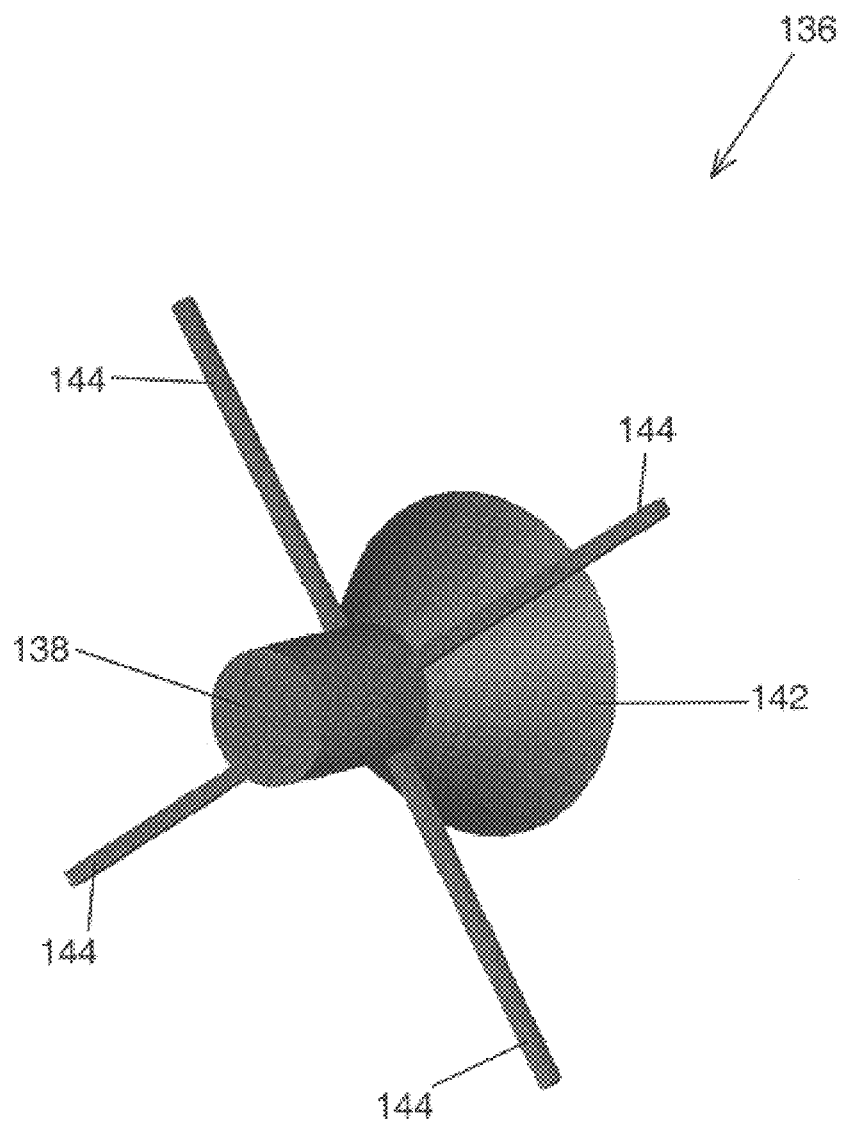
FIG. 3 is an oblique view of an active noise cancellation module of the heat dissipation device of FIG. 2, according to the present invention.
Figure 4:
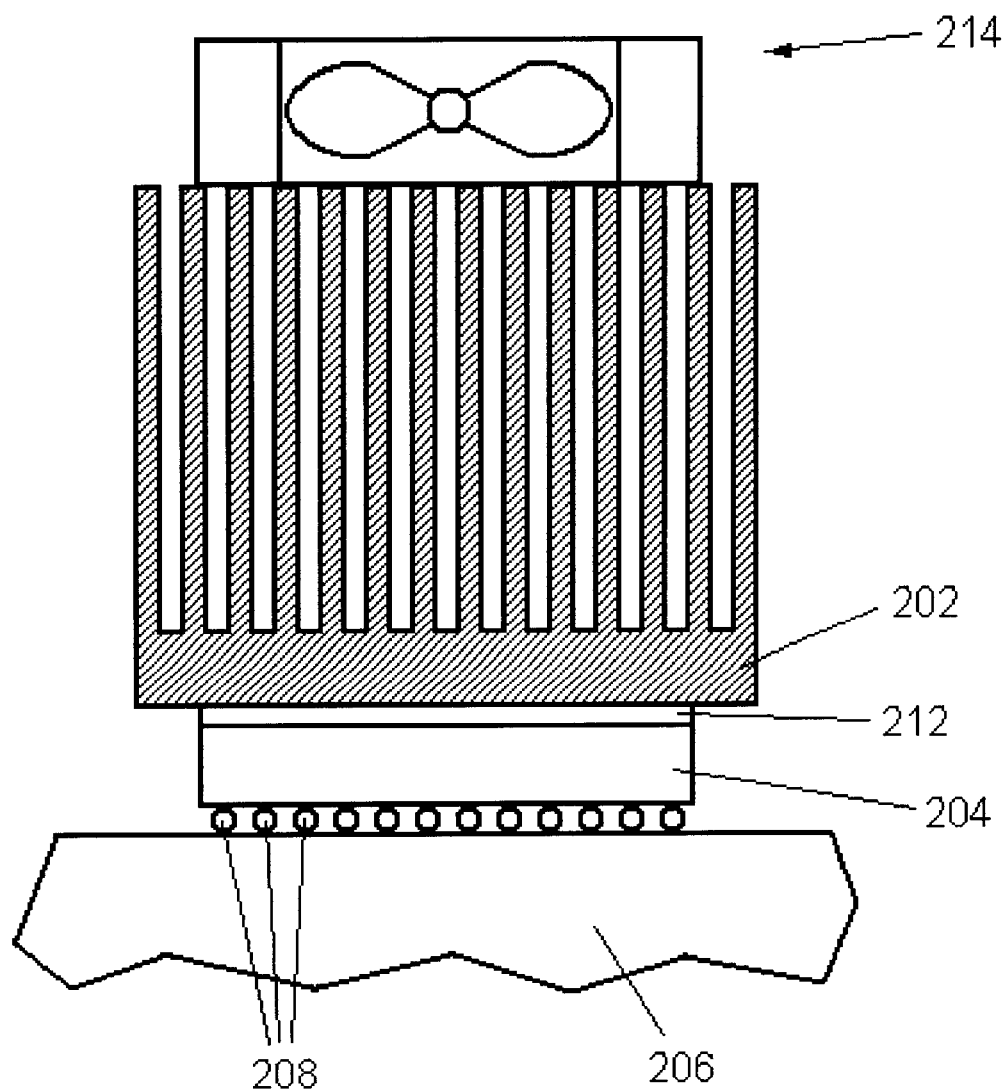
FIG. 4 is a side cross-sectional view of the heat dissipation device having a finned heat slug and a fan assembly, as known in the art.
Figure 5:
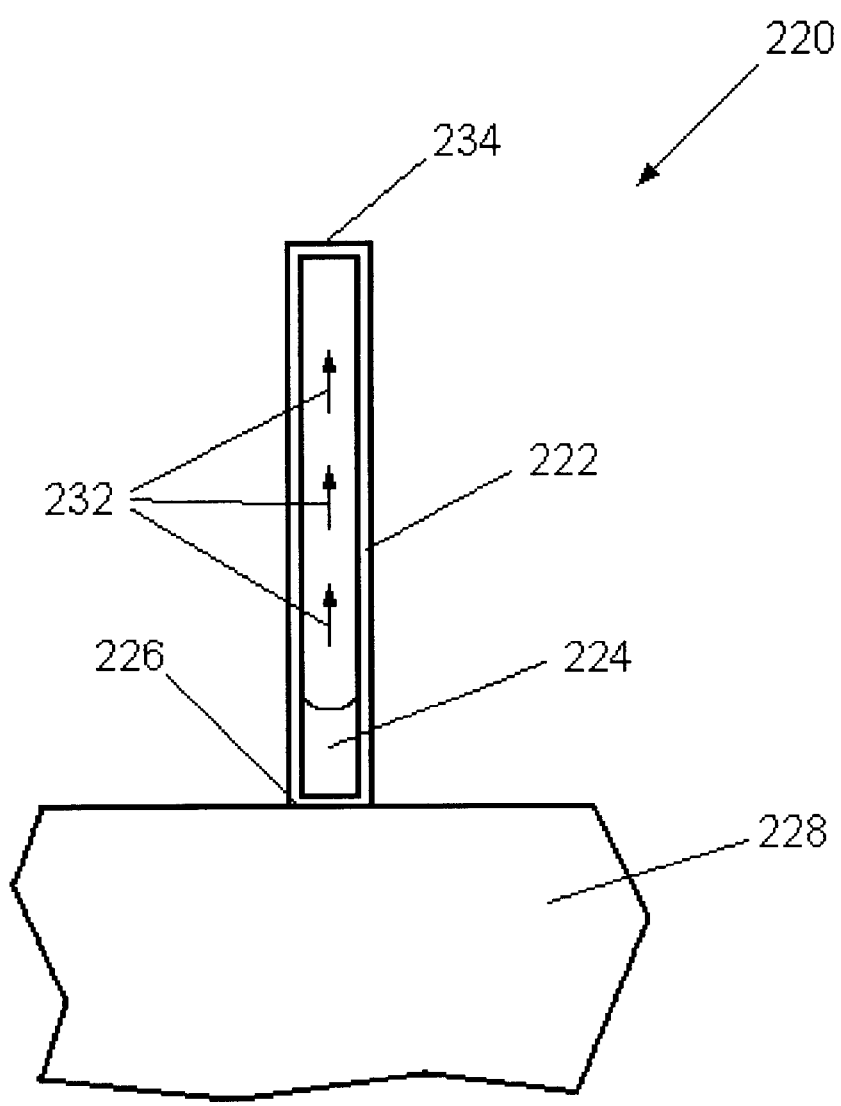
FIG. 5 is a side cross-sectional view of a heat pipe, as known in the art.

Although FIGS. 1–3 illustrate various views of the present invention, these figures are not meant to portray devices in precise detail. Rather, these figures illustrate devices in a manner to more clearly convey the concepts of the present invention. Additionally, elements common between the figures retain that same numeric designation.

One aspect of the present invention is the use of active noise cancellation within the heat dissipation device that will allow the use of larger fan and/or higher fan speeds without increasing the noise generated by the fan. Active noise cancellation systems are known in the art and are generally comprise a noise-sensing microphone, processing electronics, and an anti-noise speaker. Essentially, the noise-sensing microphone detects the unwanted noise to be cancelled and generates a signal. The signal is sent through the processing electronics where it is amplified or "processed" and a processed signal is sent to the anti-noise speaker. The processed signal triggers the anti-noise speaker to generate an equal-but-opposite sound. In other words, the anti-noise speaker emits a sound having an identical amplitude but having a frequency which is 180 degrees out-of-phase with the unwanted noise. Thus, the unwanted noise and the sound generated by the anti-noise speaker cancel one another.

The present invention allows for the use of larger and/or higher speed fans to remove heat without adding fan noise. In fact, present invention can actually reduce the overall noise produced by PC system. Thus, the present invention provides a means for high heat dissipation without necessitating high cost cooling methods such as refrigeration-type liquid cooling.

FIG. 1 illustrates a heat dissipation device 100 of the present invention. The heat dissipation device 100 comprises a substantially cylindrical, thermally conductive hollow housing 102 having an inner surface 104 and an outer surface 106. A plurality of fins 108 may be provided to extend substantially longitudinally along the housing inner surface 104, and extend substantially radially from the housing inner surface 104 into the hollow housing 102. A first heat pipe 112 extends substantially longitudinally along the hollow housing outer surface 106. A least one second heat pipe (illustrated as two heat pipes—second heat pipe 114 and 114') thermally contacts the first heat pipe 112 and extends substantially circumferentially around the hollow housing outer surface 106.

The hollow housing 102 and the plurality of fins 108 are fabricated from a conductive material, including but not limited to copper, aluminum, and the like. It is, of course, understood that the hollow housing 102 need not be cylindrical. The hollow housing 102 may be of any shape or configuration that is conductive to the various aims of the present invention.

The first heat pipe 112 preferably has a portion thereof extending from the hollow housing 102 which contacts a microelectronic die (not shown) to be cooled. At least a portion of the heat generated by the microelectronic die 110 or the like (simply shown dashed lines) is transported to the hollow housing 102 by the first heat pipe 112 and is distributed into the hollow housing 102 with the aid of the second heat pipes 114 and 114'. The heat is absorbed by the hollow housing 102 and the plurality of fins 108 wherein it is dissipated to the ambient atmosphere by forced convective heat transfer.

FIG. 2 illustrates an exploded view of the heat dissipation device 100 of FIG. 1. The hollow housing 102 preferably comprises a first hollow housing portion 122 which abuts a second hollow housing portion 124. The first hollow housing portion 122 and the second hollow housing portion 124 each have a longitudinal recess 126 and 126', respectively, in which the first heat pipe 112 resides. The first hollow housing portion 122 and the second hollow housing portion 124 may each include a circumferential recess 128 and 128', respectively, in which the second heat pipes 114 and 114' reside, respectively.

A fan 132 is placed within the hollow housing 102 proximate the junction between the first housing portion 122 and the second hollow housing portion 124. The fan 132 draws ambient air through the interior of the hollow housing 102 in direction 134 to assist in the forced convective heat transfer from the plurality of fin 108 and the hollow housing inner surface 104. An active noise cancellation assembly 136 is also placed within the hollow housing 102 proximate the fan 132. The hollow housing 102, or entry regions (i.e., the ends of the hollowing housing 102), can include sound absorbing material, which does not interfere with heart transfer from the finned surfaces.

FIG. 3 illustrates the active noise cancellation assembly 136 of FIG. 2. The active noise cancellation assembly 136 comprises a microphone 138, a speaker 142, and a mechanism (shown as legs 144) for attaching the microphone 138 and the speaker 142 to the hollow housing 102. As previously discussed, the microphone 138 detects the unwanted noise to be cancelled and generates a signal. The signal is sent through processing electronics (not shown, may be internal or external to the active noise cancellation module) where it is amplified or "processed" and a processed signal is sent to the speaker 142. The processed signal triggers the speaker 142 to emit a sound having a substantially identical amplitude but having a frequency which is approximately 180 degrees out-of-phase with the unwanted noise. Thus, the unwanted noise and the sound generated by the speaker 142 cancel one another.

Having thus described in detail embodiments of the present invention, it is understood that the invention defined by the appended claims is not to be limited by particular details set forth in the above description, as many apparent variations thereof are possible without departing from the spirit or scope thereof.

What is claimed is:

1. A heat dissipation device, comprising:
   a first thermally conductive, hollow housing portion having an outer surface and an inner surface, and a contact end;
   a second thermally conductive, hollow housing portion having an outer surface and an inner surface, and a contact end, wherein said second hollow housing portion contact end abuts said first hollow housing portion contact end;
   a first heat pipe extending longitudinally along said first hollow housing portion outer surface and said second hollow housing portion outer surface;
   a fan assembly disposed within at least one of said first hollow housing portion and said second hollow housing portion; and
   an active noise cancellation assembly disposed within at least one of said first hollow housing portion and said second hollow housing portion.

2. The heat dissipation device of claim 1, wherein said at least one of said first hollow housing portion inner surface and said second hollow housing portion inner surface includes a plurality of fins extending therefrom.

3. The heat dissipation device of claim 2, wherein said plurality of fins extending longitudinally along at least one of said first hollow housing portion inner surface and said second hollow housing portion inner surface.

4. The heat dissipation device of claim 1, wherein said first heat pipe is disposed in a first recess defined in said first hollow housing portion outer surface and a first recess defined in said second hollow housing portion outer surface.

5. The heat control device of claim 4, further including at least one second heat pipe contacting said first heat pipe, wherein said second heat pipe extends substantially around at least one of said first hollow housing portion outer surface and said second hollow housing portion outer surface.

6. The heat control device of claim 5, wherein said at least one second heat pipe is disposed in a second recess defined in at least one of said first hollow housing outer surface and said second hollow housing portion outer surface.

7. A heat dissipation device, comprising:
   a thermally conductive, hollow housing having an outer surface and an inner surface;
   a fan assembly disposed within said hollow housing;
   a first heat pipe extending longitudinally along said hollow housing outer surface; and
   an active noise cancellation assembly disposed within said hollow housing.

8. The heat dissipation device of claim 7, wherein said hollow housing inner surface includes a plurality of fins extending therefrom.

9. The heat dissipation device of claim 8, wherein said plurality of fins extending longitudinally along said hollow housing inner surface.

10. The heat dissipation device of claim 7, wherein said first heat pipe is disposed in a first recess defined in said hollow housing outer surface.

11. The heat dissipation device of claim 7, further including at least one second heat pipe contacting said first heat pipe, wherein said second heat pipe extends substantially around said hollow housing outer surface.

12. The heat dissipation device of claim 11, wherein said at least one second heat pipe is disposed in a second recess defined in said hollow housing outer surface.

13. A method of dissipating heat, comprising:
  providing a heat dissipation device comprising a thermally conductive, hollow housing having an outer surface and an inner surface, a fan assembly disposed within said hollow housing, and an active noise cancellation assembly disposed within said hollow housing, wherein said active noise cancellation assembly includes a microphone and a speaker;
  thermally contacting said heat dissipation device with a heat source;
  activating said fan assembly to draw ambient atmosphere through said hollow housing;
  detecting noise generated by said fan assembly with said microphone of said active noise cancellation assembly and generating a sound with said speaker of said active noise cancellation assembly having a substantially identical amplitude as said noise generated by said fan assembly and a frequency which is approximately 180 degrees out-of-phase with said noise generated by said fan assembly.

14. The method of claim 13, wherein said providing said hollow housing further includes providing a plurality of fins extending from said hollow housing inner surface.

15. The method of claim 14, wherein said providing said hollow housing further includes providing said plurality of fins extending longitudinally along said hollow housing inner surface.

16. The method of claim 13, further comprising disposing a first heat pipe extending longitudinally along said hollow housing outer surface.

17. The method of claim 16, further comprising forming a first recess in said hollow housing outer surface; and disposing said first heat pipe in said first recess.

18. The method of claim 16, further comprising providing at least one second heat pipe contacting said first heat pipe, wherein said second heat pipe extends substantially around said hollow housing outer surface.

19. The method of claim 18, further comprising forming at least one second recess in said hollow housing outer surface; and disposing said at least one second heat pipe disposed in a second recess.

* * * * *